US012495259B2

(12) United States Patent
Morgan et al.

(10) Patent No.: US 12,495,259 B2
(45) Date of Patent: Dec. 9, 2025

(54) EARPHONE COUPLER

(71) Applicant: ams-OSRAM AG, Premstaetten (AT)

(72) Inventors: Dylan Morgan, Eindhoven (NL); Peter McCutcheon, Eindhoven (NL); Martin Schoerkmaier, Eindhoven (NL)

(73) Assignee: ams-OSRAM AG, Premstaetten (AT)

( * ) Notice: Subject to any disclaimer, the term of this patent is extended or adjusted under 35 U.S.C. 154(b) by 256 days.

(21) Appl. No.: 18/569,981

(22) PCT Filed: Mar. 9, 2022

(86) PCT No.: PCT/EP2022/056088
§ 371 (c)(1),
(2) Date: Dec. 13, 2023

(87) PCT Pub. No.: WO2022/263021
PCT Pub. Date: Dec. 22, 2022

(65) Prior Publication Data

US 2024/0388858 A1 Nov. 21, 2024

(30) Foreign Application Priority Data

Jun. 14, 2021 (GB) ..................................... 2108462

(51) Int. Cl.
*H04R 29/00* (2006.01)
*H04R 1/10* (2006.01)
*H04R 1/28* (2006.01)

(52) U.S. Cl.
CPC ......... *H04R 29/001* (2013.01); *H04R 1/1016* (2013.01); *H04R 1/2873* (2013.01); *H04R 2460/11* (2013.01)

(58) Field of Classification Search
CPC .. H04R 29/001; H04R 1/1016; H04R 1/2873; H04R 2460/11
See application file for complete search history.

(56) References Cited

U.S. PATENT DOCUMENTS 9,456,266 B2 9/2016 Johansen et al.
9,503,827 B2 11/2016 Hu et al.
(Continued)

FOREIGN PATENT DOCUMENTS

CN 210927983 U 7/2020
CN 112312296 A 2/2021
(Continued)

OTHER PUBLICATIONS

Search Report of corresponding British Patent Application No. 2108462.9, dated Aug. 6, 2021, 3 pages (for informational purposes only).

(Continued)

*Primary Examiner* — David L Ton
(74) *Attorney, Agent, or Firm* — VIERING, JENTSCHURA & PARTNER mbB

(57) ABSTRACT

A coupler for an acoustic device includes a main opening for inserting the acoustic device or an adapter for the acoustic device. The coupler also includes a main channel connected at one end to the main opening. The coupler further includes one or more leakage paths for allowing sound to escape the main channel when in use. The coupler additionally includes one or more acoustic resonators connected to the main channel. The one or more acoustic resonators includes a first acoustic resonator configured to have a fundamental resonance frequency in the range of 500 Hz to 1 kHz and a second acoustic resonator configured to have a fundamental resonance frequency in the range of 3.85 kHz to 5 kHz.

16 Claims, 6 Drawing Sheets

(56) References Cited

U.S. PATENT DOCUMENTS

| | | | |
|---|---|---|---|
| 2009/0323995 | A1 | 12/2009 | Sibbald |
| 2011/0164757 | A1 | 7/2011 | Sibbald et al. |

FOREIGN PATENT DOCUMENTS

| | | | | | |
|---|---|---|---|---|---|
| JP | S63226200 | A | | 9/1988 | |
| WO | WO-2020118006 | A1 | * | 6/2020 | ....... G10K 11/17881 |

OTHER PUBLICATIONS

International Search Report of corresponding International Patent Application No. PCT/EP2022/056088, dated Jun. 20, 2022, 4 pages (for informational purposes only).

Dillon, Harvey, "Hearing Aids", Boomerang Press / Thieme, Jan. 2001, 62 pages.

Johnsson, Soren et al., "Simulation of the IEC 60711 Occluded Ear Simulator", Audio Engineering Society, 116th Convention, May 2004, 8 pages.

Huang, Chen-Hung et al., "Insert Earphone Modeling and Measurement by IEC-60711 Coupler", IEEE Transactions on Ultrasonics, Ferroelectrics, and Frequency Control, vol. 58 No. 2, Feb. 2011, pp. 461-469.

* cited by examiner

EARPHONE COUPLER

CROSS REFERENCE TO RELATED APPLICATION

This application is a National Stage of International Application No. PCT/EP2022/056088, filed on Mar. 9, 2022, which designates the United States and was published in Europe, and which claims priority to Great Britain Patent Application No. 2108462.9, filed on Jun. 14, 2021, in the Intellectual Property Office. All of the aforementioned applications are hereby incorporated by reference in their entireties.

FIELD OF DISCLOSURE

The invention relates to a coupler for acoustic devices such as earphones, which may be used to simulate the ear canal of a human ear in order to accurately characterise the acoustic device.

BACKGROUND

In order to design earphones, and in particular when designing earphones with active noise cancellation (ANC), the characteristics of the earphone are measured using an ear-canal simulator (coupler). The standard for this is IEC 60318-4 (711-type coupler). The standardised couplers, as these are called, were initial designed for evaluating telephone equipment and are not particularly well suited for the accurate measurements needed for ANC filter design.

The 711 coupler has an "ear canal" that is 12.4 mm long and two side-branch resonators tuned to resonant frequencies of 1.4 kHz and 3.8 kHz respectively. The acoustic resistance of the resonator neck changes its characteristics, and the 711-type coupler has very narrow slit at the opening of the neck for this.

When simulating an ear, typically only the completely sealed use-case is of interest, that is when the listening device is well placed in the ear. The 711-type coupler is designed to match the completely sealed acoustic impedance of the ear in a region of 100 Hz and 10 KHz. However, when acoustic leakage is introduced, the acoustic transfer function from an earphone speaker to the coupler microphone can vary substantially from that measured at the eardrum on a real-ear.

However, for loose-fitting earphones the seal is not consistent across people. Also for close fitting earphones, there are scenarios where leakage can become an issue.

SUMMARY

It is an object of the present disclosure to solve at least some of these problems by allowing an earphone or other acoustic device to be characterised with acoustic leakage taken into account.

According to a first aspect of the disclosure, there is provided a coupler for an acoustic device (typically an earphone or other ear-worn device). The coupler comprises a main opening/inlet for inserting the acoustic device or an adapter for the acoustic device, a main channel (simulating the ear canal) connected at one end to the main opening, and one or more leakage paths for allowing sound to escape the main channel when in use. Preferably, the leakage path(s) are adjustable in order to change the size of the leakage path(s), in order to simulate different amounts of leakage to the ambient environment.

The coupler may comprise one or more acoustic resonators connected to the main channel. The resonators are used to better simulate the acoustic response of a real ear. The acoustic resonator(s) may comprise a first acoustic resonator configured to have a fundamental resonance frequency in the range of 500 Hz to 1 KHz. A second acoustic resonator may be configured to have a fundamental resonance frequency in the range of 3.85 kHz to 5 KHz.

The acoustic resonators may be referred to as side-branch resonators. The one or more acoustic resonators are typically Helmholtz resonators. The one or more acoustic resonators may each comprise a chamber (having a resonator volume) and a neck portion connecting the chamber to the main channel. The neck portion may comprise an acoustic resistive element for changing the acoustic resistance of the neck portion. The acoustic resistive element may comprise an obstruction with a slit or other aperture or preferably an acoustic mesh provided across the neck portion to increase the acoustic resistance of the neck portion. The acoustic mesh may be, for example, a nylon mesh.

The coupler may comprise a microphone for measuring sound transmitted through the main channel. A mesh or other structure may be arranged at the end of the main channel to protect the microphone. Alternatively, the acoustic device may comprise a microphone. The microphone can be any conventional acoustic microphone, which covers a sufficiently broad spectrum (e.g. 10 Hz to 25 kHz).

The redesigned coupler can extend the frequency range of matching to the real-ear and to better match the acoustic transfer functions on a coupler when an acoustic leakage is introduced. Embodiments of the disclosure may also provide a better match of the sealed acoustic impedance to that of the human ear.

The main channel is preferably configured to have a half wavelength resonance frequency in the range of 5 kHz and 9 kHz, which is the same or similar to the half wavelength resonance of a human ear canal. For example, the main channel may have a longitudinal length in the range of 19 mm to 34 mm.

The coupler may comprise a vent covered by an acoustic mesh and connected to the main channel, wherein the vent provides one of the one or more leakage paths. The size of the leakage path may be adjusted by closing or partially closing the vent, for example the coupler may comprise a rotatable ring/disc with an aperture that can be aligned with the vent in order to open the vent. The acoustic resistance, present on the real-ear produced by viscous losses due to the narrow real acoustic leakage, can thereby be replicated.

Alternatively or in addition the coupler may comprise a socket located at least partially in the main opening and configured to hold the acoustic device or the adapter for the acoustic device, wherein the socket is configured to provide one of the one or more leakage paths between an outer wall of the socket and an inner wall of the main opening. The narrow space between the socket and the inlet to the main channel acts as a vent. This configuration can provide a realistic representation of the leakage path between a human ear and an acoustic device such as an earphone.

The coupler preferably comprises means for adjusting a position of the socket relative to the main opening in order to change a size of the leakage path. This allows different leakage conditions to be simulated in order to characterise an acoustic device over a range of leakage conditions. The means for adjusting the position of the socket may comprise a holder for a spacer, wherein the size of the leakage path is a function of a thickness of the spacer when in the holder. For example, the holder can be configured so that the socket is vertically displaced relative to the main opening by a distance equal to the thickness of the spacer in the holder. Other mechanical structures which allow for precise displacement of the socket relative to the main opening are also possible.

According to a second aspect of the disclosure, there is provided a kit comprising the coupler of anyone of the first aspect and further comprising one or more spacers for inserting in the holder of the coupler. The one or more spacers have thicknesses in the range of 0.01 mm and 5 mm. The coupler can be used together with the spacers to characterise an acoustic device over a range of leakage.

According to a third aspect there is provided a method of characterizing acoustic properties of an acoustic device using a coupler according to the first aspect or a kit according to the second aspect. The method comprises providing the acoustic device or an adapter with the acoustic device in the main opening of the coupler to provide an acoustic system (including the acoustic device and the coupler), emitting sounds with the acoustic device over a range of frequencies, and measuring the emitted sounds with a microphone (e.g. a microphone of the coupler or in the acoustic device). The method further comprises adjusting the one or more leakage paths of the coupler to change an acoustic transfer function of the acoustic system, and repeating the steps of emitting and measuring. The step of adjusting the one or more leakage paths may comprise adjusting the position of the socket relative to the main opening.

The proposed coupler design and method can be used use in an ANC design process in order to provide an Adaptive Leakage Compensation (ALC) algorithm, which can be used in digital noise cancellation chip for acoustic devices such as earphones and headphones.

BRIEF DESCRIPTION OF THE PREFERRED EMBODIMENTS

Specific embodiments of the disclosure are described below with reference to the accompanying drawings, wherein FIG. 1 depicts an ear with an earphone in different positions;

Figure 5A:
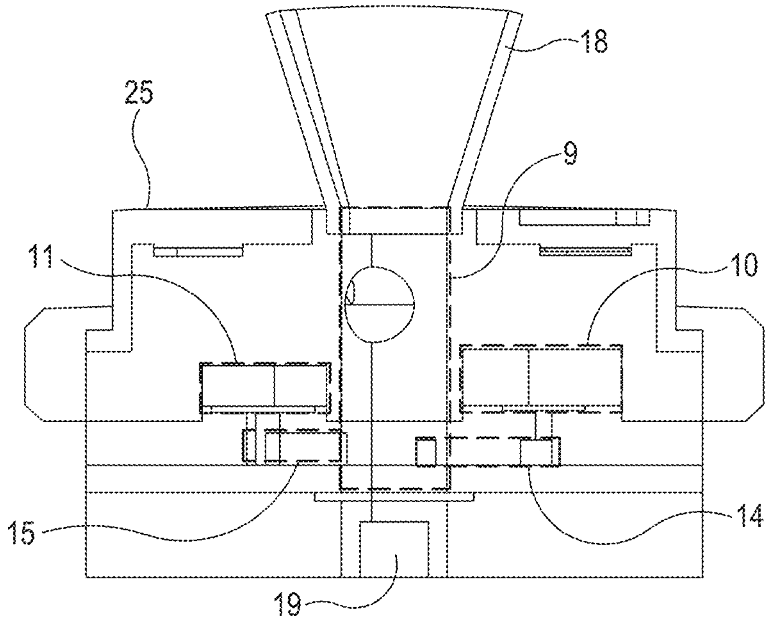
Figure 5B:
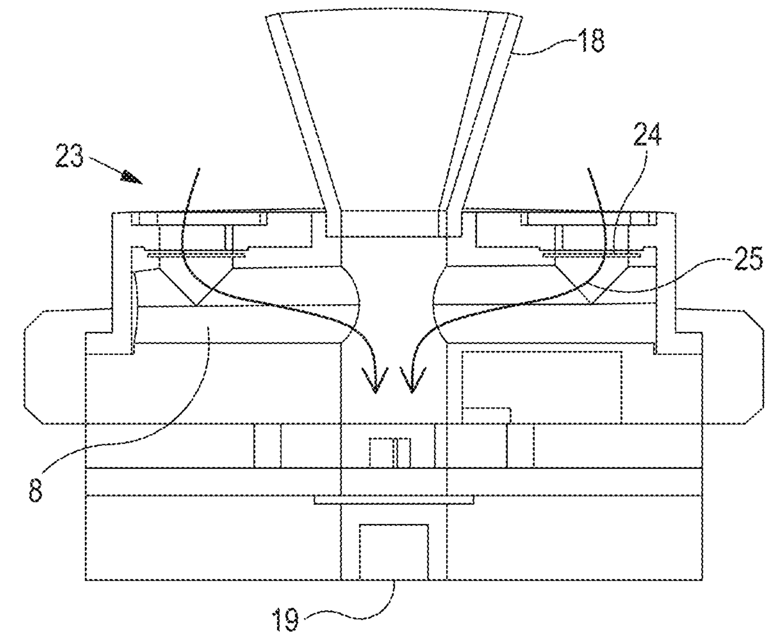
Figure 6:
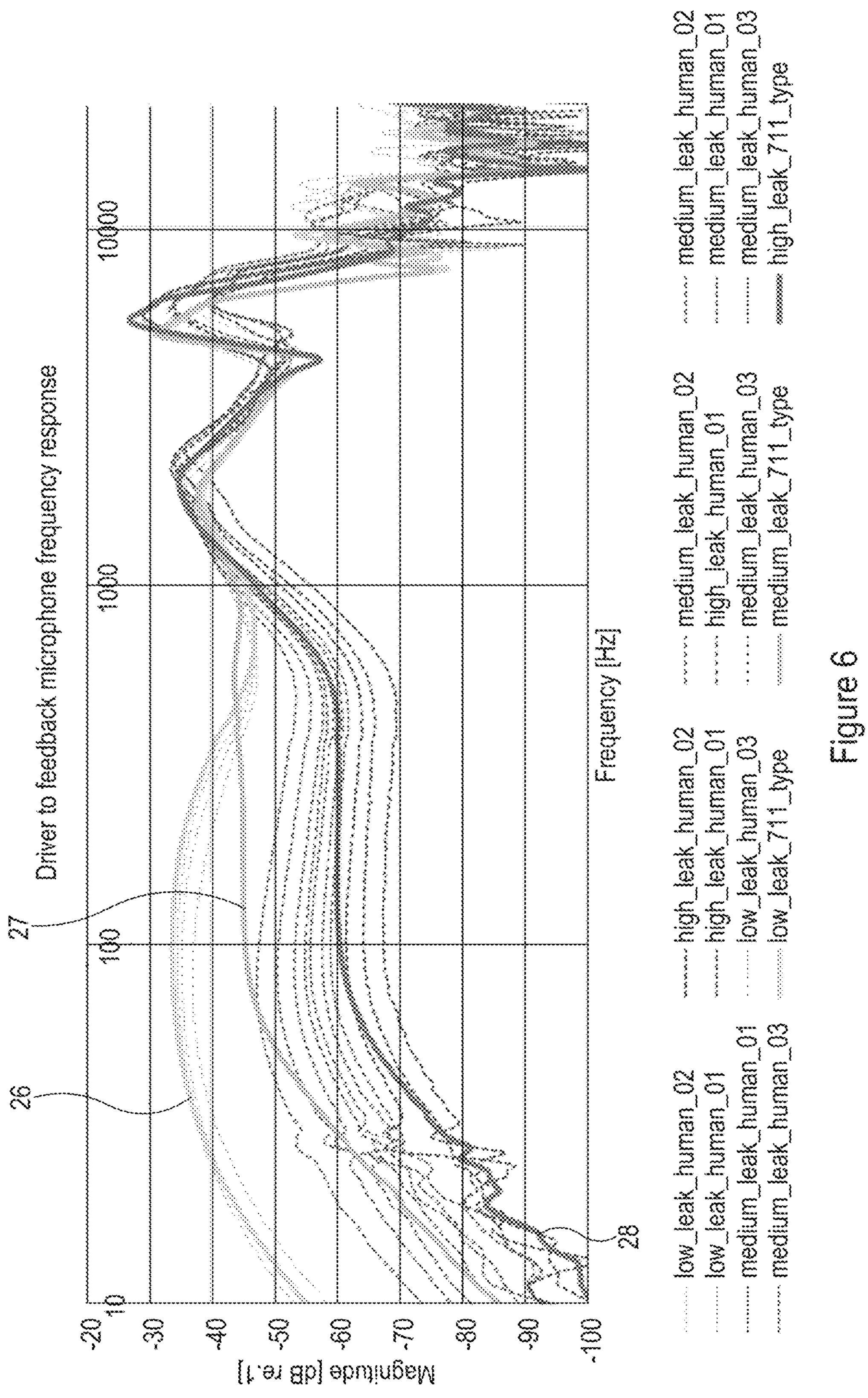
Figure 7:
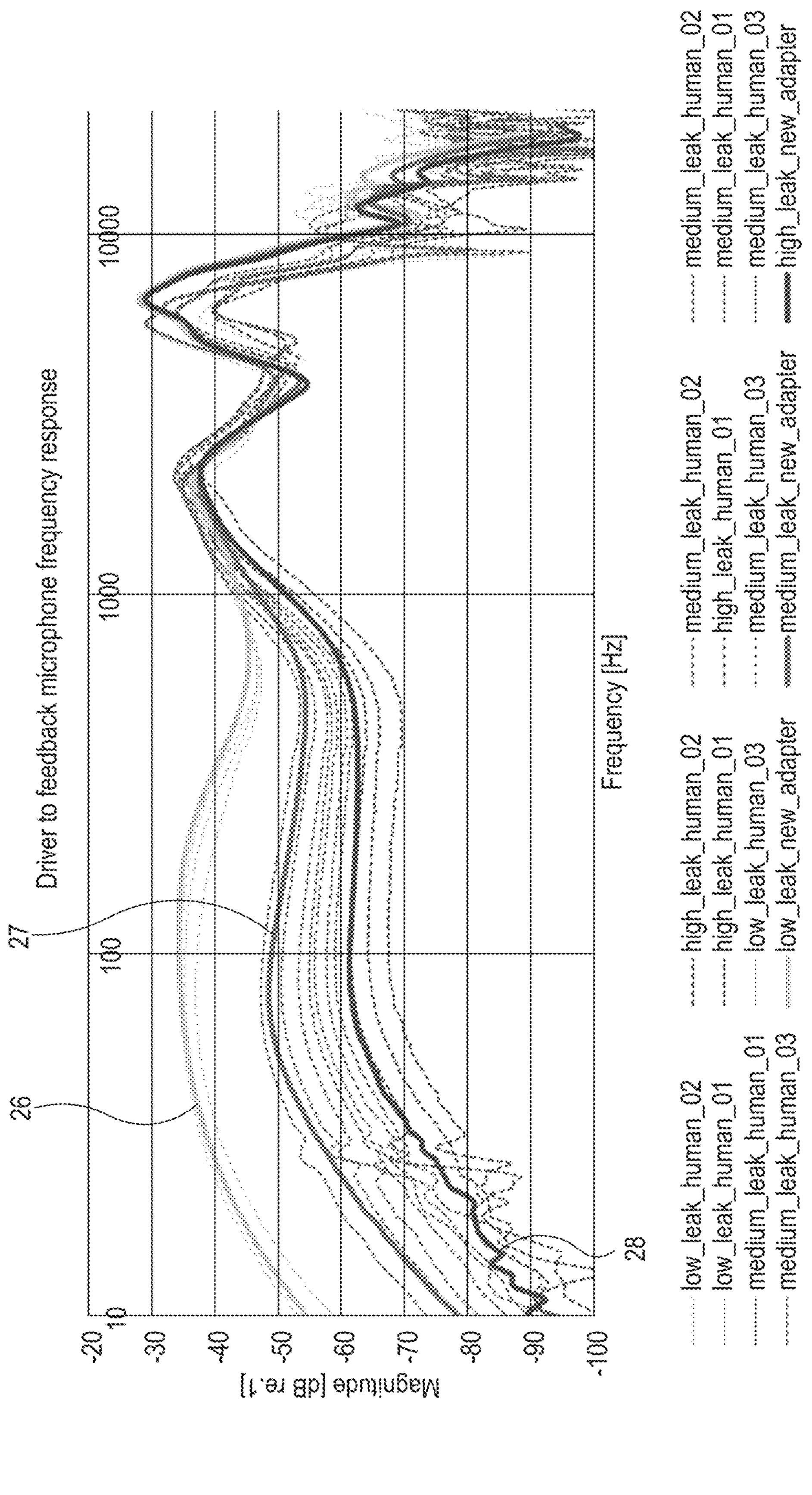

FIG. 5*a* depicts a first cross sectional view of a coupler according to an embodiment with adjustable vents for providing adjustable leakage paths; depicts a second cross sectional view of the coupler according to the embodiment;

FIG. 5*b* depicts a second cross sectional view of the coupler according to the embodiment;

FIG. 6 depicts a graph plotting the microphone frequency response in a conventional coupler for different leakage conditions compared to the frequency response in a real human ear; and FIG. 7 depicts a graph plotting the microphone frequency response in a coupler according to an embodiment under the same leakage conditions and also compared to the frequency response in a real human ear.

DETAILED DESCRIPTION

Figure 1:
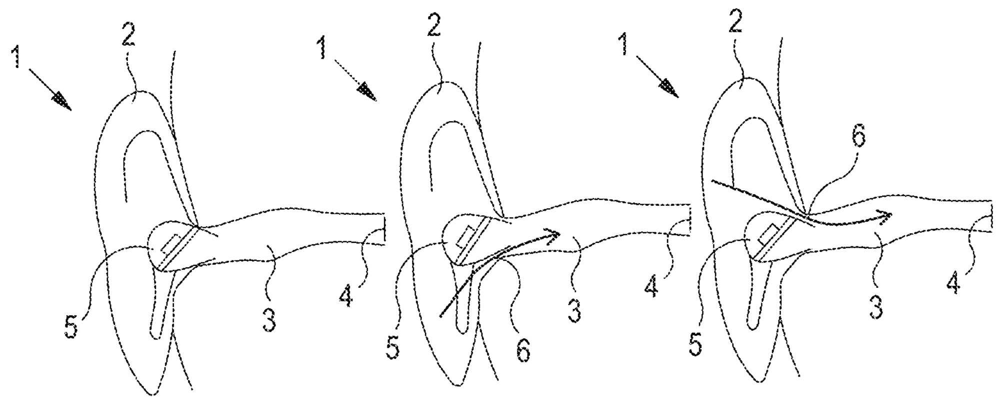

FIG. 1 shows a schematic diagram of an ear 1 comprising an outer ear 2, ear canal 3 and eardrum 4. An earphone 5 is inserted into the ear 1 and together they form an acoustic system. The acoustic transfer function from the earphone 5 to the ear 1 depends on the seal between the earphone 5 and the ear canal 3. As can be seen, a slightly displaced earphone 5 can create a leakage path 6, which allows sound (pressure) to escape the ear canal 3.

Figure 2:
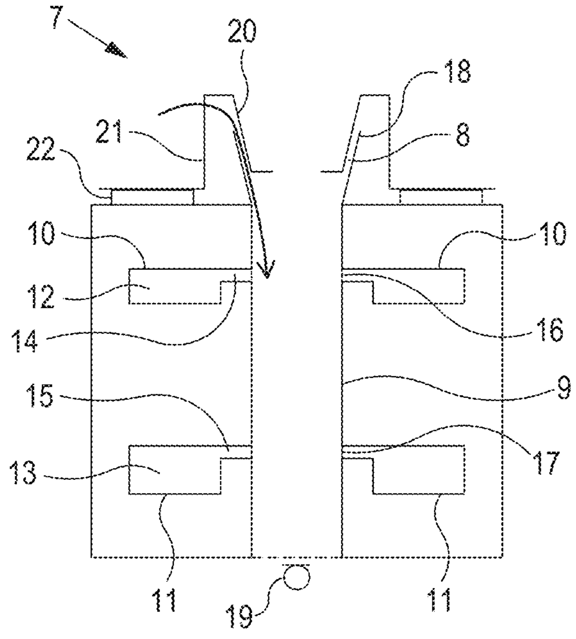
FIG. 2 depicts a schematic diagram of a coupler for an earphone according to an embodiment with a leakage path provided between a socket for the earphone and an opening of the coupler.

FIG. 2 shows a schematic diagram of a coupler 7 for an earphone according to an embodiment for simulating an ear with a leakage path 8. The coupler 7 comprises a main channel 9 for simulating the ear canal, with two acoustic resonators 10 and 11 being Helmholtz resonators for providing a realistic acoustic response. Each resonator comprises a chamber 12 and 13 having a specific volume and a neck portion 14 and 15 connecting the chamber 12 and 13 to the main channel 9. To control the acoustic resistance of the resonators 10 and 11, respective acoustic meshes 16 and 17 are located in the neck portions 14 and 15. The coupler 7 has an opening 18 at one end of the main channel 9 and a microphone 19 located at the opposite end. A mesh or other structure may be arranged at the end of the main channel 9 to protect the microphone 19. The main channel 9 has a length of about 26 mm to provide a half-wavelength resonance frequency of about 6.5 kHz (compared to 14 kHz of the existing 711-coupler).

The coupler 7 further comprises a socket 20 for holding the earphone (or for holding an adapter with the earphone). The socket 20 is located partially in the opening 18 of the main channel 9. The coupler comprises means 21 for adjusting the position of the socket 20 is arranged to form and adjust the leakage path 8 between the socket 20 and the opening 18. By increasing the distance between the socket 20 and the opening 18, the size of the leakage path 8 increases (simulating a larger gap between the earphone and the ear). The means 21 comprises a holder for holding a spacer 22. The size of the leakage path 8 is then a function of the thickness of the spacer.

The resonators 10 and 11 are configured to provide specific resonance frequencies. The resonance frequency of a Helmholtz resonator can be given by:

$$f_c = \frac{c_0}{2\pi}\sqrt{\frac{A}{V_0 l'}} \tag{1}$$

where $c_0$ is the speed of sound in air, A is the cross-sectional area of the resonator neck portion, $V_0$ is the volume of the resonator chamber and/is the effective length of the neck portion, which is given by:

$$l' = l + 0.6a \tag{2}$$

where l is the actual length of the neck portion and a is the effective radius of the neck portion.

The first acoustic resonator 10 has a resonance frequency of substantially 615 Hz and the second acoustic resonator 11 has a resonance frequency of substantially 3.9 kHz, to provide an improved (more realistic) loose-fitting acoustic response compared to the existing 711-coupler.

The length of the coupler ear-canal is important in producing the half-wavelength resonance. For the 711-coupler, the "ear canal" length is approximately 12.4 mm, producing a resonance at 14 kHz, given by:

$$f_c = \frac{c_0}{2\pi} \tag{3}$$

However, surprisingly, the inventors have found that a main channel having a length of 26 mm produces a resonance closer to that of the real ear with a loose-fitting earphone at a frequency of 6.5 kHz.

Figure 3:
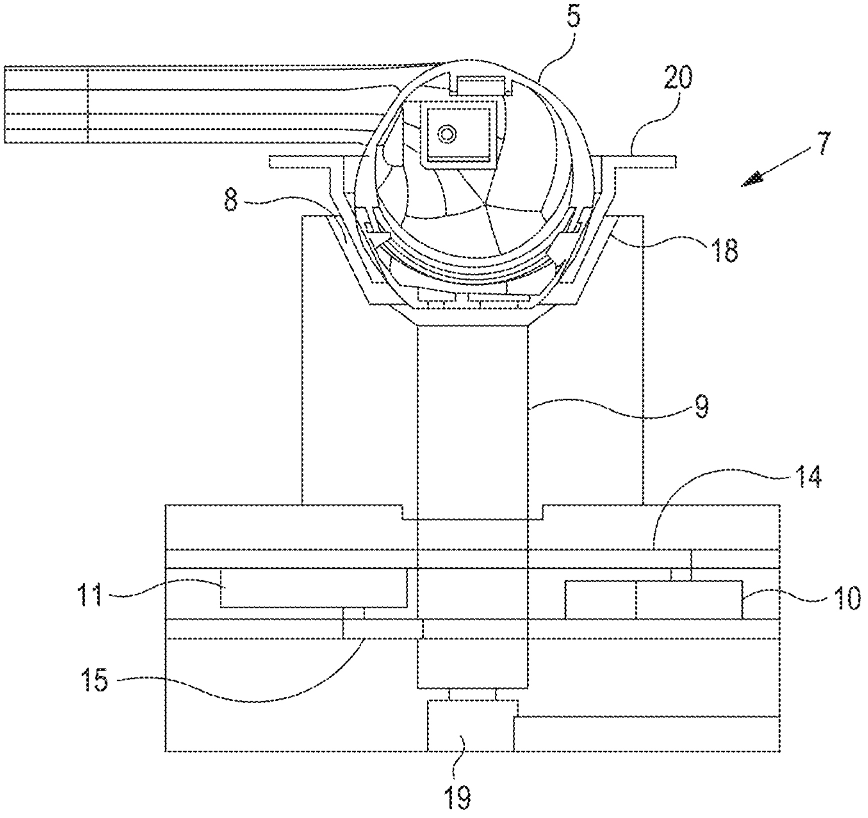
FIG. 3 depicts a cross section of a coupler for an earphone according to an embodiment with a leakage path provided between a socket for the earphone and an opening of the coupler.

FIG. 3 shows a schematic diagram of another embodiment of a coupler 7 together with an earphone 5 forming an acoustic system. The same reference numerals have been used for the same or similar features in different embodiments to aid understanding, and the reference numerals are not intended to limit the embodiments. The coupler 7 comprises a main channel 9 ("ear canal") with opening 18 at one end and a microphone 19 at the other end. The coupler further comprises a first acoustic resonator 10 connected to the main channel 9 via the neck portion 14 of the resonator 10, and a second acoustic resonator 11 connected to the main channel 9 via the neck portion 15 of the resonator 11. The first acoustic resonator 10 is configured to have a first resonance frequency and the second acoustic resonator is configured to have a second, higher resonance frequency in order to accurately simulate the acoustic response of an ear.

The coupler 7 has a socket 20 in the opening 18 holding the earphone 5. The socket 20 is configured so that there is no leakage path between the earphone 5 and the socket 20. The socket 20 can be displaced from the opening 18 so as to create a narrow passage between the outer wall of the socket 20 and the inner wall of the opening 18, which provides the leakage path 8. The position of the socket 20 can be controlled relative to the opening 18 in order to control the amount of acoustic leakage. This allows the earphone 5 to be characterized over a range of leakage including no leakage (sealed condition).

Figure 4:
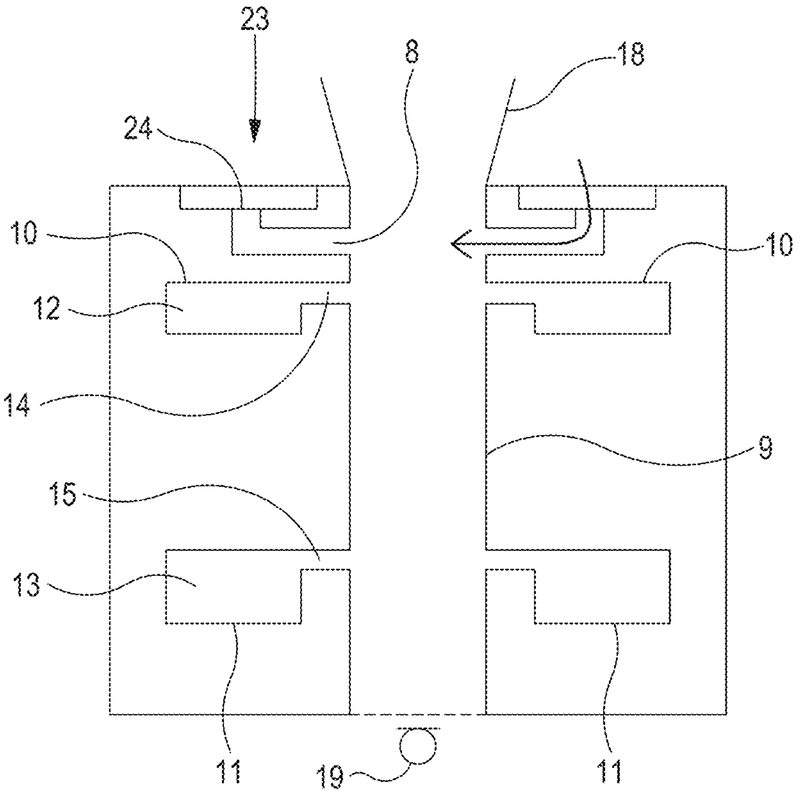
FIG. 4 depicts a schematic diagram of a coupler according to another embodiment with vents connected to the main channel for providing leakage paths.

FIG. 4 is a schematic diagram of a coupler 7 according to another embodiment. The coupler 7 comprises many of the same features as the embodiments shown in FIGS. 1 and 2, and additionally comprises two vents 23 for providing leakage paths 8. Each vent is connected to the main channel 9 and comprises an acoustic mesh 24 for controlling the acoustic resistance of the vent 23. Preferably the vent 23 is an adjustable vent, which can be used to change the size of the leakage path 8.

The vent 23 approximates the real acoustic leakage of an earphone in a real ear by providing an acoustic mass, given by:

$$M_A = \frac{\rho_0 l'}{\pi a^2} \tag{4}$$

where $\rho_0$ is the density of air, and adding the acoustic resistive mesh 24 to the vent 23.

FIGS. 5*a* and 5*b* show two different cross sections of a coupler 7 according to an embodiment. The coupler 7 comprises a main channel 9 to simulate the ear canal, first and second acoustic resonator 10 and 11 comprising respective neck portions 14 and 15. The opening 18 for inserting the earphone is located at one end of the main channel 9 and a microphone 19 is located at the opposite end. The coupler 7 further comprises vents 23 with an acoustic mesh 24 for providing a leakage path 8 to simulate acoustic leakage 25. The coupler 7 comprises a rotatable ring 25 with openings being means for adjusting the size of the leakage path 8 by closing or partially closing the vents 23 in order to simulate different amounts of acoustic leakage 25.

FIG. 6 shows the microphone frequency response for a 711-coupler (solid lines) for low 26, medium 27 and high 28 acoustic leakage, and for a human ear (dashed lines).

As can be seen, the 711-coupler provides a poor match to the human ear for medium and high leakage conditions over the frequency range of 200 Hz to 1000 Hz.

FIG. 7 shows the microphone frequency response for a coupler according to an embodiment (solid lines) for low 26, medium 27 and high 28 acoustic leakage and for a human ear (dashed lines). As can be seen, the embodiment provides a closer match over the frequency range.

Although specific embodiments have been described above, the claims are not limited to those embodiments. Each feature disclosed may be incorporated in any of the described embodiments, alone or in an appropriate combination with other features disclosed herein.

REFERENCE NUMERALS

1 Ear 15 Second neck portion
2 Outer ear 16 First acoustic mesh
3 Ear canal 17 Second acoustic mesh
4 Ear drum 18 Opening
5 Earphone 19 Microphone
6 Leakage path 20 Socket
7 Coupler 21 Means for adjusting
8 Leakage path 22 Spacer
9 Main channel 23 Vent
10 First acoustic resonator 24 Acoustic mesh
11 Second acoustic resonator 25 Rotating ring
12 First chamber 26 Low acoustic leakage
13 Second chamber 27 Medium acoustic leakage
14 First neck portion 28 High acoustic leakage

The invention claimed is:

1. A coupler for an acoustic device comprising:

a main opening for inserting the acoustic device or an adapter for the acoustic device;

a main channel connected at one end to the main opening;

one or more leakage paths for allowing sound to escape the main channel when in use; and one or more acoustic resonators connected to the main channel, wherein the one or more acoustic resonators comprise a first acoustic resonator configured to have a fundamental resonance frequency in the range of 500 Hz to 1 kHz and a second acoustic resonator configured to have a fundamental resonance frequency in the range of 3.85 kHz to 5 kHz.

2. The coupler according to claim 1, wherein the one or more acoustic resonators are Helmholtz resonators.

3. The coupler according to claim 1, wherein the one or more acoustic resonators each comprises a chamber and a neck portion connecting the chamber to the main channel, and wherein said neck portion comprises a resistance element for changing the acoustic resistance of the neck portion.

4. The coupler according to claim 3, wherein the resistance element comprises an acoustic mesh provided across the neck portion to increase the acoustic resistance of the neck portion.

5. The coupler according to claim 1, further comprising a microphone for measuring sound transmitted through the main channel.

6. The coupler according to claim 1, wherein the main channel is configured to have a half wavelength resonance frequency in the range of 5 kHz and 9 kHz.

7. The coupler according to claim 1, wherein the main channel has a longitudinal length in the range of 19 mm to 34 mm.

8. The coupler according to claim 1, further comprising a vent covered by an acoustic mesh and connected to the main channel, wherein the vent provides one of the one or more leakage paths.

9. The coupler according to claim 1, further comprising a socket located at least partially in the main opening and configured to hold the acoustic device or the adapter for the acoustic device, wherein the socket is configured to provide one of the one or more leakage paths between an outer wall of the socket and an inner wall of the main opening.

10. The coupler according to claim 9, further comprising means for adjusting a position of the socket relative to the main opening in order to change a size of the leakage path.

11. The coupler according to claim 10, wherein the means for adjusting the position of the socket comprises a holder for a spacer, and wherein the size of the leakage path is a function of a thickness of the spacer when in the holder.

12. The coupler according to claim 11, wherein the holder is configured so that the socket is vertically displaced relative to the main opening by a distance equal to the thickness of the spacer in the holder.

13. A kit comprising the coupler of claim 11 and further comprising one or more spacers for inserting in the holder of the coupler.

14. The kit according to claim 13, wherein the one or more spacers have thicknesses in the range of 0.01 mm and 5 mm.

15. A method of characterizing acoustic properties of an acoustic device using a coupler according to claim 1, the method comprising:

providing the acoustic device or an adapter with the acoustic device in the main opening of the coupler to provide an acoustic system;

emitting sounds with the acoustic device over a range of frequencies;

measuring the emitted sounds with a microphone;

adjusting the one or more leakage paths of the coupler to change an acoustic transfer function of the acoustic system; and repeating the steps of emitting and measuring.

16. A method of characterizing acoustic properties of an acoustic device using a coupler according to claim 9, the method comprising:

providing the acoustic device or an adapter with the acoustic device in the main opening of the coupler-to provide an acoustic system;

emitting sounds with the acoustic device over a range of frequencies;

measuring the emitted sounds with a microphone;

adjusting the one or more leakage paths of the coupler to change an acoustic transfer function of the acoustic system; and repeating the steps of emitting and measuring, wherein the step of adjusting the one or more leakage paths comprises adjusting a position of the socket relative to the main opening.

* * * * *